(12) United States Patent  
Krishnapuram et al.

(10) Patent No.: US 7,299,273 B2
(45) Date of Patent: Nov. 20, 2007

(54) METHOD AND SYSTEM TO BUNDLE MESSAGE OVER A NETWORK

(75) Inventors: Raghuram Krishnapuram, New Delhi (IN); Krishna Kummamuru, New Delhi (IN); Manoj Kumar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/319,966

(22) Filed: Dec. 16, 2002

(65) Prior Publication Data

US 2004/0117469 A1    Jun. 17, 2004

(51) Int. Cl.
*G06F 15/177* (2006.01)
(52) U.S. Cl. ............ 709/220; 709/201; 709/202; 709/203; 709/217; 709/218; 709/219; 709/220
(58) Field of Classification Search ........ 709/217–220, 709/201–203
See application file for complete search history.

(56) References Cited

U.S. PATENT DOCUMENTS

| | | | |
|---|---|---|---|
| 4,873,517 A * | 10/1989 | Baratz et al. .............. 370/236 |
| 5,805,823 A * | 9/1998 | Seitz .......................... 709/236 |
| 5,951,634 A * | 9/1999 | Sitbon et al. ............... 718/105 |
| 6,064,770 A * | 5/2000 | Scarth et al. ............... 382/225 |
| 6,154,778 A * | 11/2000 | Koistinen et al. ........... 709/228 |
| 6,304,639 B1 * | 10/2001 | Malomsoky et al. .. 379/112.04 |
| 6,407,994 B1 | 6/2002 | Archer |
| 7,072,960 B2 * | 7/2006 | Graupner et al. ........... 709/223 |
| 7,092,369 B2 * | 8/2006 | Fuccello et al. ............ 370/328 |
| 2001/0027494 A1 | 10/2001 | Deo et al. |
| 2002/0019985 A1 * | 2/2002 | Fuccello et al. ............ 725/133 |
| 2002/0124101 A1 | 9/2002 | Schaeck |
| 2003/0236822 A1 * | 12/2003 | Graupner et al. ........... 709/203 |
| 2004/0017783 A1 * | 1/2004 | Szentesi et al. ............ 370/256 |
| 2004/0044600 A1 * | 3/2004 | Chu et al. ..................... 705/34 |
| 2004/0199488 A1 * | 10/2004 | Schultz et al. ................ 707/1 |
| 2005/0149481 A1 * | 7/2005 | Hesselink et al. ............. 707/1 |

* cited by examiner

*Primary Examiner*—Nathan J. Flynn
*Assistant Examiner*—Mohamed Wasel
(74) *Attorney, Agent, or Firm*—Gibb & Rahman, LLC

(57) ABSTRACT

The invention describes a method and system to optimize network bandwidth and obtain greater efficiency in transmission of messages/data in, a client-server network. The invention proposes the use of clustering of client requests and the data items in such a manner so as to optimize the network transmission as well as reduce the cost of processing involved in sending and picking/pruning the data items at server and client end respectively.

16 Claims, 4 Drawing Sheets the field of information METHOD AND SYSTEM TO BUNDLE
MESSAGE OVER A NETWORK

FIELD OF THE INVENTION

The present invention relates to the field of information dissemination over a computer network. More particularly the invention relates to client server architecture in a computer network where clients seek information items from the server by generating request messages and receiving data messages.

BACKGROUND OF THE INVENTION

Modern computer networks often involve systems/agents/servers that are required to maintain (have) a large database of information (Items). For example, yahoo.com provides news, stock market quotes, sports information, multimedia content etc involving a multitude of large databases. The databases are used to serve requests for subsets of items of information from various client systems (Information seekers/Seekers).

The most obvious manner of fulfilling the requests is by sending the requested subsets of items to each individual client. This approach however may burden the computational resources of the server as well as the network resources. Alternatively, the server could broadcast all items to all information seekers and the individual recipients would then extract the information required by it. This solution results in inefficient utilization of the network bandwidth while at the same time burdening each recipient with the task of searching through an enormous amount of information. One manner of resolving the contradicting requirements on computational costs at the server as well as at the client system is to group items that are requested by groups of clients and then furnish the set of responses to the corresponding groups of clients. In this manner, a tradeoff between the contradicting requirements can be achieved that optimizes a global objective.

There are various types of costs involved in servicing the requests from clients. The server will incur some cost each time it sends an information bundle across to the clients.

A given client may not receive exact number of items that it has requested; it may receive more/less number of items than that the requested number. There is a cost associated with each item that a client did not receive. Also, there is a cost associated with each item it received and did not request for, because the client has an additional burden to prune such extra information.

U.S. Pat. No. 5,805,823 provides a system and method for optimal multiplexed message aggregation between client applications in a client-server network. This invention provides for a message architecture that multiplexes messages to a client. This invention does a plain simple aggregation of messages and not of clients. Further the aggregation done is plain and simple and no optimisation technique is defined in order to save on computational resources.

US patent Publication Ser. No. 2002020124101A1 relates to server side optimization of content delivery to clients by selective in-advance delivery to enable performance optimization based on the current load of the server. This invention based on probabilistic measure delivers the content in advance to the clients. It does not take into consideration the actual requests by one or more clients.

US patent Publication Ser. No. 20010027494A1 bundles one or more messages destined for the same address or sub-address. The data packets are managed only for the same client and the computing devices being served by it. The bundling is done based on the user-defined time limit or the packet size. The invention does not disclose any method wherein an optimisation between bundling the messages as against transmitting them alone is achieved.

U.S. Pat. No. 6,407,994 provides a system and method for bundling messages for transmission in a telecommunications network. This patent bundles one or more messages intended only for a particular client and does not take into consideration other clients having the requests for the same information item. Thereby though this patent reduces the bandwidth requirement, it does nothing to tackle the processing overhead involved at the server or at the client end.

SUMMARY OF THE INVENTION

The object of the present invention is to minimize the overall cost of satisfying clients' requests by simultaneously clustering the clients and their requests. The optimization covers computational costs at both the server and the client.

To achieve the said objective the proposed invention first formulates the various costs involved in serving requests from various clients. The invention then applies a method and system for simultaneously clustering clients and items. The clustering is carried-out over a number of requests and clients over a range of configurable pre-defined values and calculates the costs involved for each chosen cluster number value. The invention uses a fuzzy clustering algorithm for simultaneously clustering the clients and items so as to minimize the overall cost of satisfying the clients' requests.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative preferred embodiment when read in conjunction with the accompanying drawings, wherein:

DETAILED DESCRIPTION

Figure 1:
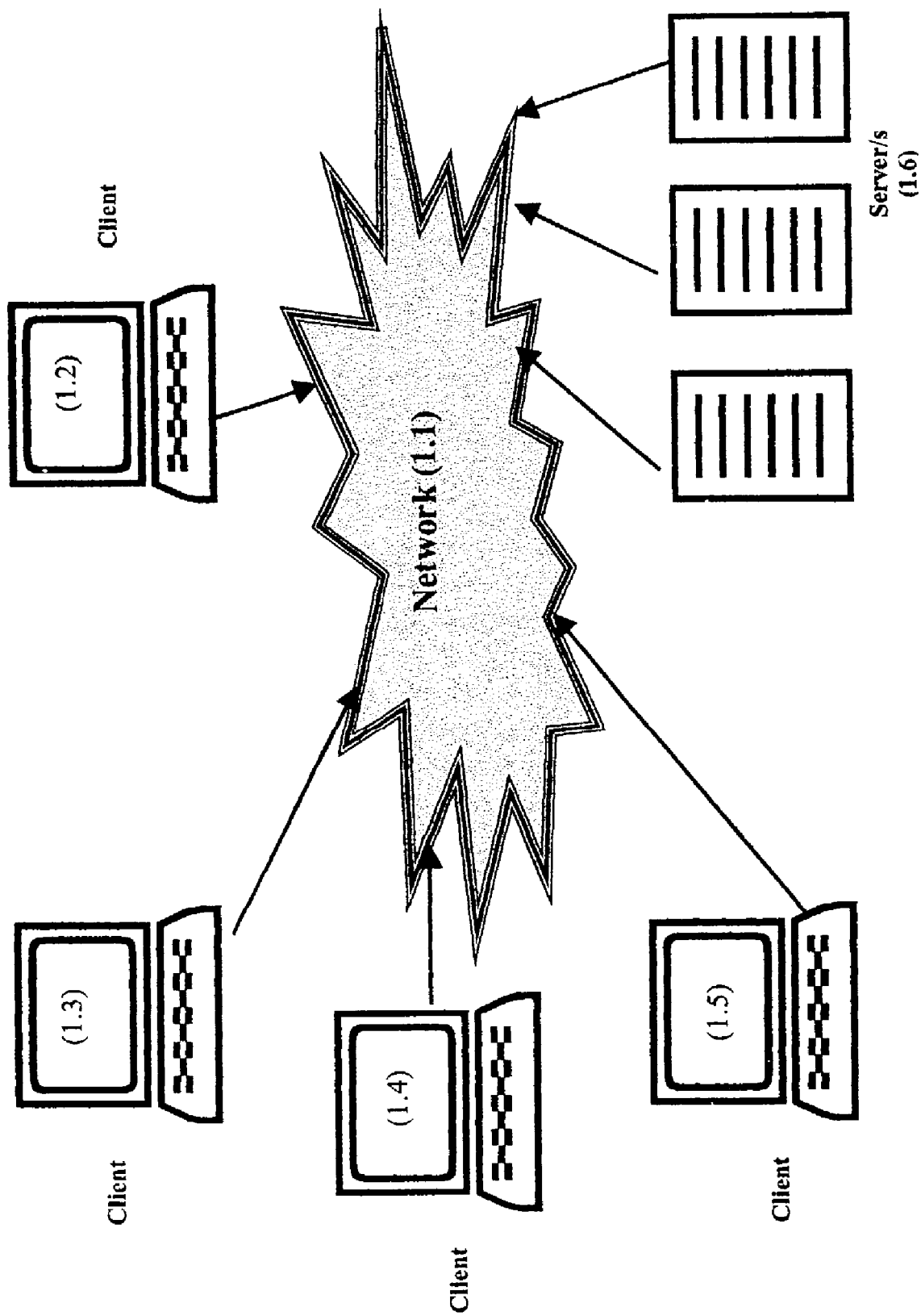
FIG. 1 shows a basic network structure comprising of the servers (storing items) and the clients.

FIG. 1 shows a general client-server network on which the invention might be practiced. It consists of one or more servers (1.6) connected to a network (1.1). The network and scope covers all types of networks such as Local Area Network, Internet and the like. Also present on the network are different clients (1.2, 1.3, 1.4, 1.5). The interconnection between different clients on the network is by any known communication means such as wired links, radio links or by infrared transmissions. The networking topology covers all known topologies such as star, linear, ring or a combination of any of these. The clients and the server communicate using any of the known communication protocols such as TCP/IP or Ethernet. The number of servers and the clients is not limited and the data could reside either on one server or could be distributed over a number of servers. The server (1.6) acts as the information store and clients are seekers of information sending requests to the server for information items contained therein.

The clients (1.2, 1.3, 1.4, 1.5) comprise be electronic devices such as personal computers, mobile phones, interactive televisions and the like, operated by humans or software agents operating on behalf of individuals or organizations.

Figure 2:
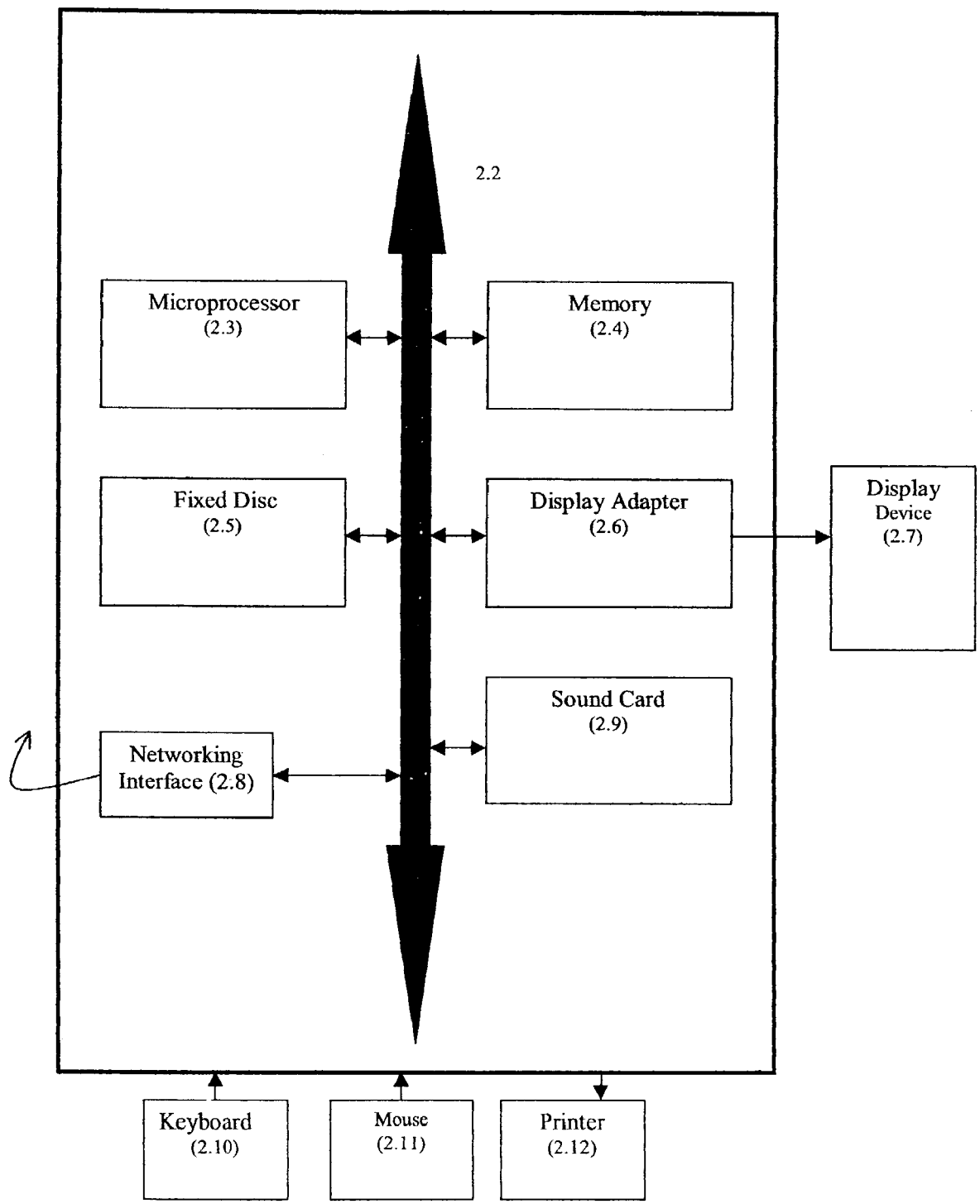
FIG. 2 depicts the internal structure of a generic computing system on which the invention might be practiced by using them as a server as well as a client.

FIG. 2 shows a block diagram of a general computing system (2.1) on which the invention might be practiced. The computer system (2.1) consists of various subsystems interconnected with the help of a system bus (2.2). The microprocessor (2.3) communicates and controls the functioning of other subsystems. The microprocessor (2.3) also acts as the control unit operating in conjunction with memory (2.4) to perform operations as defined by the stored instructions. In a general computer system the control module is any commercially available processor of which x86 processors from Intel and 680X0 series from Motorola are examples. The computing system could be a single processor system or may use two or more processors on a single system or over a network. This control module also controls the functioning of the other components of the computing system (not shown). Control module (2.3) accesses said memory (2.4) through system bus (2.2) that interconnects the various parts of the computing device. The control module executes a program called the operating system for the basic functioning of the computer system. Some examples of operating systems are UNIX, WINDOWS and DOS. These operating systems allocate the computer system resources to various programs and facilitate the interaction of users with the system. Memory (2.4) supports the microprocessor in its functioning by storing instructions and data required for program execution. Examples of memory are random access memory devices such as dynamic random access memory (DRAM) or static memory (SRAM). Storage Device (2.5) is used to hold the data and instructions permanent in nature such as the operating system and other programs. Video Interface (2.6) is used as an interface between the system bus and the display device (2.7), which is generally a video display unit such as a monitor. The network interface (2.8) is used to connect the computer with other computers on a network which can be either a Local Area Network (LAN) or a Wide Area Network (WAN) or any other type of computer network, through wired or wireless means. This networking interface can also be used to connect to the Internet. The computer system might also contain a sound card (2.9). The system is connected to various input devices like keyboard (2.11) and mouse (2.12) and output devices like printer (2.13), through an input/output Interface (2.10). Various configurations of these subsystems are possible. It should also be noted that a system implementing the present invention might use less or more number of the subsystems than described above.

In the preferred embodiment of the invention, the instructions are stored on the storage device (2.5) in the form of a computer program. This program contains coded instructions for different algorithms described herein the specification. On running the program, the instructions are transferred to the memory (2.4) and the microprocessor (2.3) executes the instructions. The system can be manually controlled by giving instructions through means of input devices such as keyboard (2.11) and mouse (2.12). Instructions, whether from the program or from the user input reside in the memory (2.4) and are subsequently acted upon by the microprocessor (2.3). It should be understood that the invention is not limited to any particular hardware comprising the computer system or the software running on it.

Those of ordinary skill in the art will appreciate that the various means for generating service requests by the clients and their processing by the server are computer programs. These programs are capable of existing in an embedded form within the hardware of the system or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:

a) conversion to another language, code or notation b) reproduction in a different material form.

The depicted example in FIG. 2 is not meant to imply architectural limitations and the configuration of the incorporating device of the said means may vary depending on the implementation. Any kind of computer system or other apparatus adapted for carrying out the means described herein can be employed for practicing the invention. A typical combination of hardware and software is a general purpose computer system with a computer program that when loaded and executed, controls the computer system such that it carries out the means described herein Other examples of the incorporating device that may be used are notebook computers or hand held computers, PDAs etc.

The problem sought to be solved by the instant invention maybe defined as follows:

Let $r_1, \ldots, r_N$ be N information/message items and $s_1, \ldots, s_M$ be M clients. Let $$a_{ij} = \begin{cases} 1, & \text{if } s_j \text{ seeks } r_i, \text{ and} \\ 0, & \text{otherwise.} \end{cases}$$

Let $R_1, \ldots,$ and $R_K$ be sets of subsets of items that are sent to subsets $S_1, \ldots,$ and $S_K$, of clients, respectively. Let $R_1, \ldots,$ and $R_K$ be represented by N-dimensional binary column vectors and $S_1, \ldots,$ and $S_K$ also by M-dimensional binary column vectors. Also, let $R=[r_{ij}]=[R_1, \ldots, R_K]$ and $S=[s_{ij}]=[S_1, \ldots, S_K]$ represent the corresponding matrices. That is, $$r_{ij} = \begin{cases} 1, & \text{if } r_i \text{ is in } j\text{th cluster, and} \\ 0, & \text{otherwise.} \end{cases}$$

$$s_{ij} = \begin{cases} 1, & \text{if } s_i \text{ is in } j\text{th cluster, and} \\ 0, & \text{otherwise.} \end{cases}$$

Then, the cost at the server is proportional to K and the cost at a client depends on the number of extra items it received and the number of the items it requested but did not receive. Let $T=[t_{ij}]$ where $t_{ij}$ is the number of copies of $r_i$ that $s_j$ receives, $$t_{ij} = \sum_{l=1}^{K} r_{il} s_{jl}.$$

Then, the total number of items received by $s_j$ is $\Sigma_i^{t_{ij}}$. Therefore, the total cost of sending $R_1, \ldots, R_K$ sets of items to $S_1, \ldots, S_K$ sets of clients is $$\Phi(R, S, K) = \alpha K + \beta \sum_{j=1}^{M} |t_j \nabla a_j| \quad (1)$$

where, $a_j = [a_{1j}, \ldots, a_{Nj}]$ is the vector representing the items requested by $s_j$, $t_j = [t_{1j}, \ldots, t_{Nj}]$ is the vector representing the items received by $s_j$, and $|x \nabla y|$ represents the cardinality of the symmetric difference between vectors x and y. The problem then is to find R, S, and K such that $\phi(R, S, K)$ is minimized.

The solution to the above problem depends on the matrix $A=[a_{ij}]$. As a simple example, consider a case in which M clients, each seeking only one item, seek M distinct items (that is, M<N). Since all clients are identical from the optimization point of view, assume that the M items requested by the clients are grouped into K equal groups and each group of items is multicast to the corresponding set of clients that request the items in the group. Then, $|t_j \nabla a_j|=M/K-1$ the solution to the above optimization problem, result in $$K = M\sqrt{\beta/\alpha}.$$

One of the inferences from the above equation is that the items should be grouped and multicast to serve the requests only when $\beta M^2 > \alpha$, i.e., the server processing cost is at least M times more important than that of clients.

Figure 3:
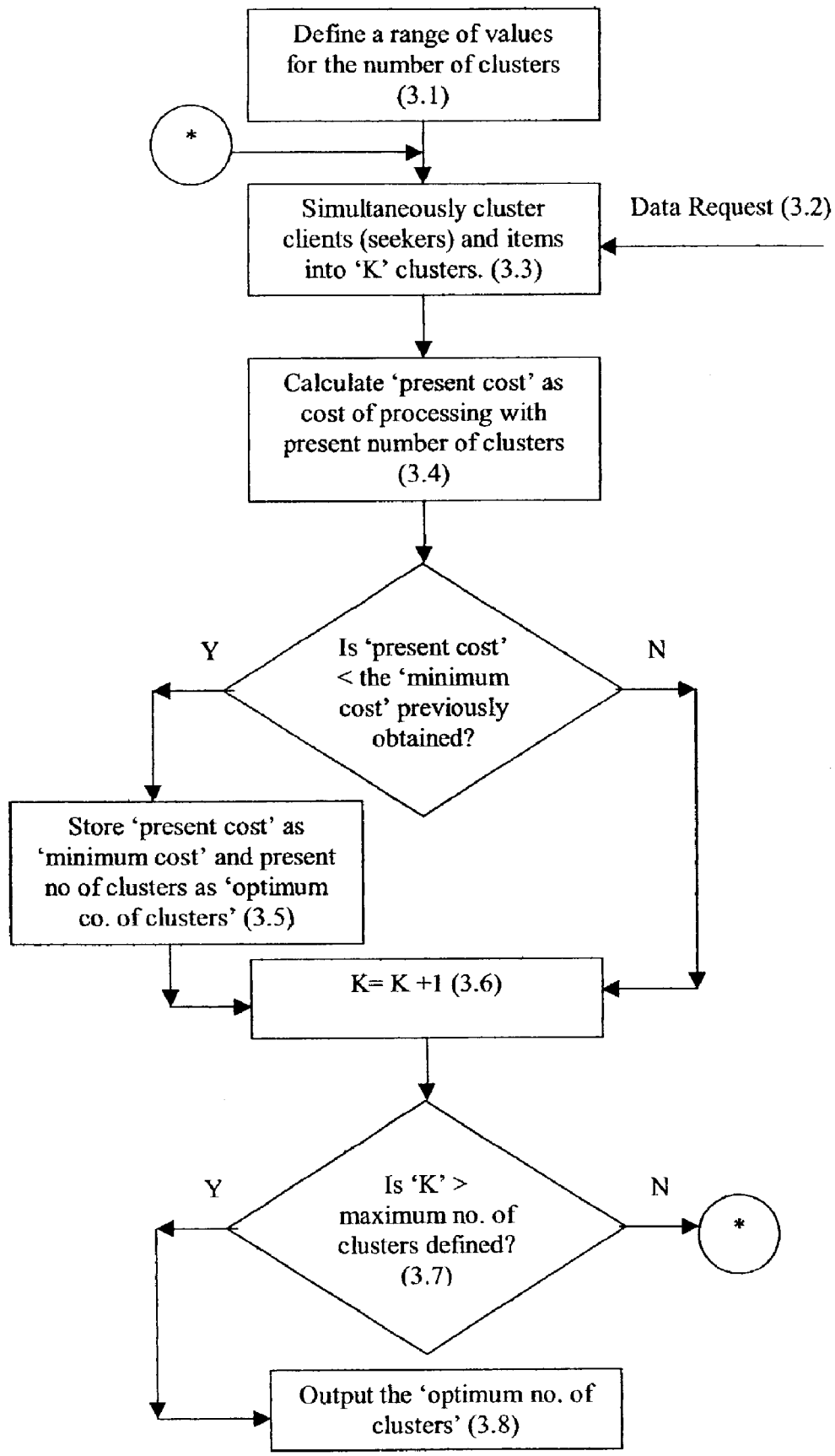
FIG. 3 is a flowchart for the method described herein.

The invention proposes to solve the aforementioned problem of optimization through clustering of clients and items. The basic steps involved are highlighted in FIG. 3. Firstly a range of values for the number of clusters is defined and K is set to the minimum value (3.1). Using the data of clients' requests (3.2), clients (seekers) and items are simultaneously clustered into 'K' clusters (3.3). The cost of processing with the resulting clusters of items and clients is then calculated (3.4). If the present cost is less than the minimum cost obtained previously (if any) (3.5) then present cost is stored as the minimum cost. Also, the present number of clusters is classified as optimum number of clusters. Next step increments K by 1 (3.6). If K becomes greater than the maximum value of clusters defined (3.7) then optimum number of clusters as stored is output and items and clients are clustered using this number (3.8). Steps 3.3 to 3.6 are repeated till maximum value for clusters is reached. The method of simultaneously clustering items and clients (3.3) is explained below in more detail:

Finding an optimal solution to the above stated problem, when A is an arbitrary binary matrix, is difficult. This invention proposes a clustering algorithm that approximately solves the above problem by finding a sub-optimal solution.

The solution operates by finding R and S that minimizes $\phi(R, S, K)$ for various values of K over a given range, and then selecting a K that minimizes the objective function. An optimization algorithm based on fuzzy set theory that optimizes $\phi(R, S, K)$ for a given K, denoted as $\phi(R, S)$ for simplicity is given below. For a given K, the solution optimizes $$\Phi(R, S) = \sum_{j=1}^{M} |t_j \nabla a_j|. \quad (2)$$

Assume element $s_j$ belongs to the l-th cluster with a fuzzy membership $s_{jl}$ and $r_i$ belongs to the l-th cluster with a fuzzy membership $r_{il}$, where $s_{jl} \in [0,1]$ and $r_{il} \in [0,1]$. These fuzzy memberships are required to satisfy $$\sum_{l=1}^{K} r_{il} = 1, \text{ and} \quad (3)$$

$$\sum_{l=1}^{K} s_{jl} = 1. \quad (4)$$

To achieve this new objective function required to be minimized is:

$$\Phi(R, S) = \sum_{j=1}^{M} |t_j \nabla a_j| + \rho(R, S) + \sum_{i=1}^{N} \eta_i \left( \sum_{l=1}^{K} r_{il} - 1 \right) + \sum_{j=1}^{M} \mu_j \left( \sum_{l=1}^{K} s_{jl} - 1 \right) \quad (5)$$

where, $\rho(R, S)$ is a regularization function that helps in specifying the degree of fuzziness, and $\eta_i$ and $\mu_j$ are the Lagrange's multipliers corresponding to conditions (3) and (4) respectively. The fuzzy symmetric difference between $t_j$ and $a_j$ is computed as $$|t_j \nabla a_j| = \sum_{i=1}^{N} |t_{ij} - a_{ij}|.$$

One of the examples of $\rho(R, S)$ is $$\rho(R, S) = \lambda_r \sum_{i=1}^{N} \sum_{l=1}^{K} r_{il} \log(r_{il}) + \lambda_s \sum_{j=1}^{M} \sum_{l=1}^{K} s_{jl} \log(s_{jl}) \quad (6)$$

It is to be noted that individual terms in $\rho(R, S)$ maximize when $s_{jl}$ and $r_{il}$ equals to either 1 or 0. $\lambda_r$ and $\lambda_s$ are the weighting parameters that specify the degree of fuzziness. Let $u_{ij} = \text{sign}(t_{ij} - a_{ij})$ where, $$\text{sign}(x) = \begin{cases} 1 & \text{if } x > 0, \\ 0 & \text{if } x = 0, \\ -1 & \text{otherwise.} \end{cases}$$

Then, $$|t_j \nabla a_j| = \sum_{i=1}^{N} u_{ij}(t_{ij} - a_{ij}). \quad (5)$$

The necessary conditions for the optimality of $\phi$ with $\rho(R,S)$ as given in (6) with respect to $s_{jl}$ and $r_{il}$ are given below:

$$\frac{\partial \Phi}{\partial s_{jl}} = \sum_{i=1}^{N} u_{ij} r_{il} - \lambda_s(1 + \log(s_{jl})) + \mu_j = 0 \text{ and,} \quad (7)$$

$$\frac{\partial \Phi}{\partial r_{il}} = \sum_{j=1}^{M} u_{ij} s_{jl} - \lambda_r(1 + \log(r_{il})) + \eta_i = 0. \quad (8)$$

And, the necessary conditions with respect to $\eta i$ and $\mu j$ are defined in equations (3) and (4). Solving for $s_{jl}$ and $r_{il}$ from equations (3), (4), (7) and (8), results in:

$$s_{jl} = \frac{\exp\left(-\left(\frac{\hat{r}_{jl}}{\lambda_s} + 1\right)\right)}{\sum_{m=1}^{K} \exp\left(-\left(\frac{\hat{r}_{jm}}{\lambda_s} + 1\right)\right)} \text{ and,} \quad (9)$$

$$r_{il} = \frac{\exp\left(-\left(\frac{\hat{s}_{il}}{\lambda_r} + 1\right)\right)}{\sum_{m=1}^{K} \exp\left(-\left(\frac{\hat{s}_{im}}{\lambda_r} + 1\right)\right)} \quad (10)$$

where, $$\hat{r}_{jl} = \sum_{i=1}^{N} u_{ij} r_{il} \text{ and } \hat{s}_{il} = \sum_{j=1}^{M} u_{ij} s_{jl}.$$

Figure 4:
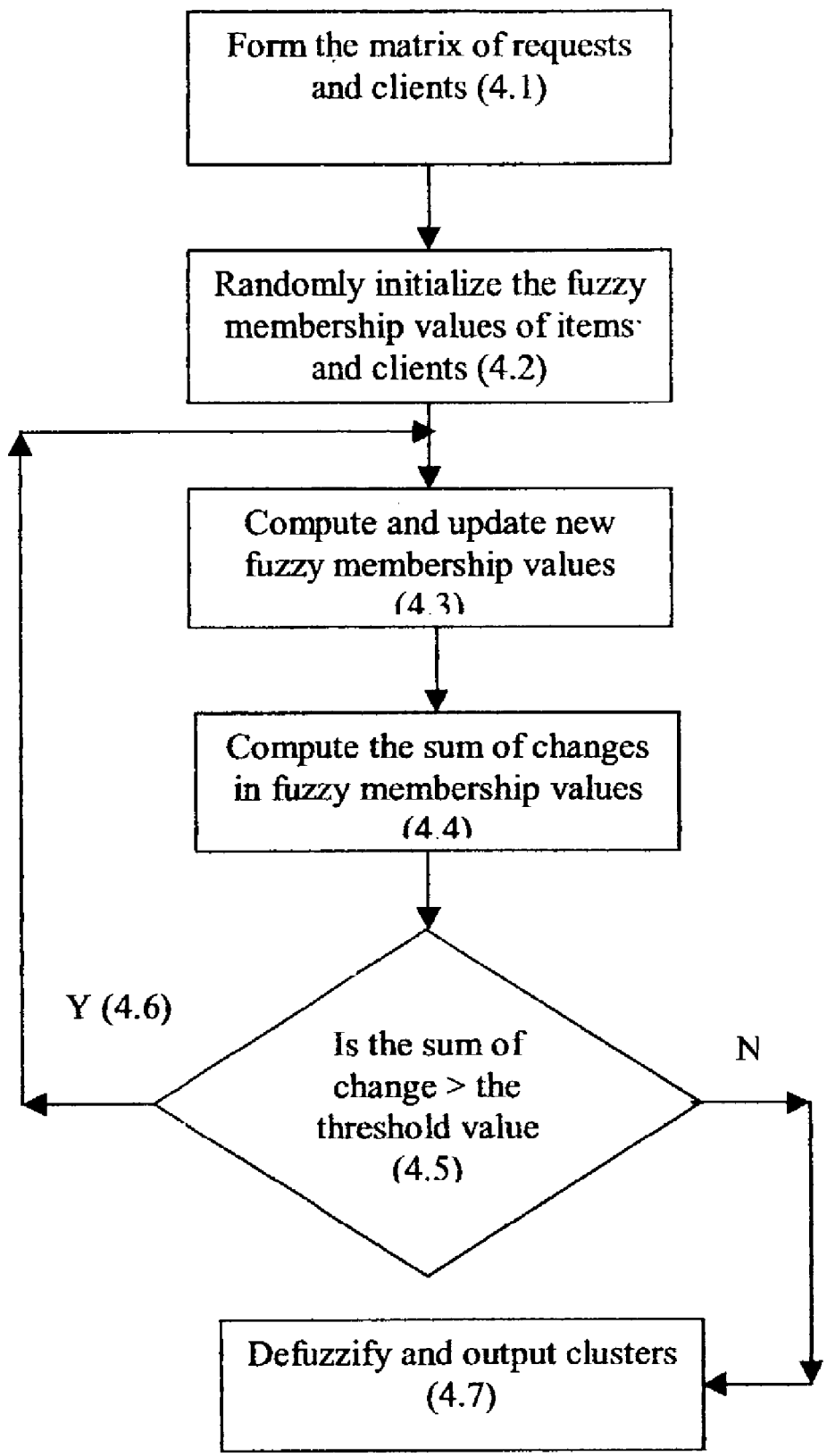
FIG. 4 is a flowchart for the process of simultaneously clustering items and clients for a given number of clusters.

Picard iteration is used with (9) and (10) to optimize the objective function given in (5). Start with some initial random values for $s_{jl}$ and $r_{il}$ the values of $s_{jl}$ and $r_{il}$ are updated using (9) and (10) respectively at every iteration, until convergence or some termination condition is achieved. Finally the fuzzy memberships $s_{jl}$ and $r_{il}$ are defuzzied to obtain crisp clusters of clients and items. FIG. 4 shows the various steps of the algorithm, which are summarized as below:

Step 1. Form the matrix $A=[a_{ij}]$ based on the requests made by various clients (4.1).

Step 2. Initialize $s_{jl}$ and $r_{il}$ randomly such that equations (3) and (4) are satisfied (4.2).

Step 3. Compute a new set of $s_{jl}$, $s'_{jl}$ using equation (9). (4.3)

Step 4. Compute a new set of $r_{il}$, $r_{il}'$ using equation (10). (4.3)

Step 5. If $$\sum_{i,l} |r'_{il} - r_{il}| > \theta_r, \text{ and } \sum_{j,l} |s'_{jl} - s_{jl}| > \theta_s$$

(4.4) then copy $r'_{il}$ to $r_{il}$, copy $s'_{jl}$ to $s_{jl}$, and go to Step 3. (4.5,4.6)

Step 6. Copy $r'_{il}$ to $r_{il}$, and copy $s'_{jl}$ to $s_{jl}$. (4.7)

Step 7. Defuzzify $s_{jl}$ and $r_{il}$. (4.7)

Step 8. End.

Defuzzification converts a vector of fuzzy memberships to a vector of binary values. In other words, it assigns items and clients to various clusters based on the fuzzy memberships. Suppose $f=(f_1, \ldots, f_K)$ represents the fuzzy membership of an item or a client in cluster $C_l$, for $l=1, \ldots, K$. The method given below defuzzifies f to obtain $g=(g_1, \ldots g_K)$ where $g_i$ is binary for $i=1, \ldots, K$. Let $f'=\max, (f-1)$, then the elements of g are obtained using the following equation:

$$g_i = \begin{cases} 1, & \text{if } f_i > \gamma f' \\ 0, & \text{otherwise} \end{cases} \text{ for } i = 1, \ldots, K$$

where $\gamma$ is a constant less than 1.

Other Modifications:

The other form of regularization term, $\rho(R, S)$ possible is:

$$\rho(R, S) = \lambda_r \sum_{i=1}^{N} \sum_{l=1}^{K} r_{il}^2 + \lambda_s \sum_{j=1}^{M} \sum_{l=1}^{K} s_{jl}^2 \quad (10)$$

Using this in equation (5) the resultant update equations for $s_{jl}$ and $r_{il}$ are $$r_{jl} = \frac{1}{2\lambda_s}\left(\frac{1}{K}\sum_{m=1}^{K} \hat{s}_m - \hat{s}_l\right), \text{ and} \quad (11)$$

$$s_{jl} = \frac{1}{2\lambda_s}\left(\frac{1}{K}\sum_{m=1}^{K} \hat{r}_m - \hat{r}_l\right). \quad (12)$$

It will be apparent to those with ordinary skill in the art that the foregoing is merely illustrative and not intended to be exhaustive or limiting, having been presented by way of example only and that various modifications can be made within the scope of the above invention. The present invention can be realized in hardware, software or a combination of hardware and software. The modules as described in the invention could either be realized in a centralized manner, on one computer system could be spread across several interconnected computer systems. Any kind of computer system or other apparatus adapted for carrying out the methods described herein is suited. A typical combination of hardware and software could be a general purpose computer system with a computer program that, when loaded and executed, controls the computer system such that it carries out the methods described herein.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

What is claimed is:

1. A method for minimizing an overall cost of processing client requests for items in a client-server network, said method comprising:
   defining a range of values for a number of clusters into which requesting clients and requested items in said client requests from said requesting clients are to be clustered;
   simultaneously clustering said requested items and said requesting clients into a set number of clusters, using a clustering algorithm, wherein said set number of clusters is a value within said range;
   calculating a cost of processing said set number of clusters of said requested items and said requesting clients, wherein said cost is based on a difference between items received and items requested by said requesting clients;
   repeating said processes of simultaneously clustering and calculating such that said cost is calculated for each of said values within said range; and
   determining a cluster combination that provides a minimum overall cost of processing said client requests
   wherein said process of simultaneously clustering said requested items and said requesting clients further comprises:
      randomly initializing fuzzy membership values of said requested items and said requesting clients;
      iteratively calculating said fuzzy membership values until a sum of changes of membership values is less than a configurable threshold value; and
      defuzzifying said fuzzy membership values to obtain actual clusters of said requested items and said requesting clients.

2. The method as claimed in claim 1, further comprising assigning clusters of said requested items to respective clusters of said requesting clients.

3. The method as claimed in claim 1, wherein said requested items comprise at least one of data, information and messages requested by said requesting clients.

4. A system for minimizing an overall cost of servicing client requests for items, said system operable in a client-server network and comprising:
   a selector operable for defining a range of values for a number of clusters into which requesting clients and requested items in said client requests from said requesting clients are to be clustered;
   an organizer operable for simultaneously clustering said requested items and said requesting clients into a set number of clusters, using a clustering algorithm, wherein said set number of clusters is a value within said range and wherein said clustering algorithm is adapted to:
      randomly initialize fuzzy membership values of said requested items and said requesting clients;
      iteratively calculate said fuzzy membership values until a sum of changes of membership values is less than a configurable threshold value; and
      defuzzify said fuzzy membership values to obtain actual clusters of said requested items and said requesting clients,;
   a calculator operable for establishing a total processing cost for said set number of clusters of said requested items and said requesting clients, wherein said cost is based on a difference between items received and items requested by said requesting clients and wherein said organizer and said calculator are further adapted to repeat said simultaneous clustering and said establishing of said total processing cost for each of said values within said range; and
   a component operable for establishing a minimum overall cost of processing said client requests.

5. The system as claimed in claim 4 further comprising a device operable for assigning clusters of said requested items to respective clusters of said requesting clients.

6. The system as claimed in claim 4, wherein said requesting clients comprise request generating computing devices that are connected to at least one other computing device, wherein said at least one other computing device is adapted to function as a servers servicing requests made by said requesting clients.

7. The system as claimed in claim 4, wherein said requested items comprise at least one of information, messages, and data requested by said requesting clients.

8. The system as claimed in claim 5, wherein said system resides on at least one server device:
   a system bus;
   a communications unit connected to said system bus;
   a memory unit including a set of instructions connected to said system bus; and
   a control unit executing said instructions in said memory unit.

9. The system as claimed in claim 6, wherein said requesting clients are interconnected to said system through a computer network comprising at least one of an Ethernet, an Internet, a LAN, a WAN, and a MAN.

10. A computer program product comprising computer readable program code stored on a computer readable storage medium embodied therein for performing a method for minimizing an overall a total cost of processing client requests for items in a client-server network, said method comprising:
   defining a range of values for a number of clusters into which requesting clients and requested items in said client requests from said requesting clients are to be clustered;
   simultaneously clustering said requested items and said requesting clients into a set number of clusters, using a clustering algorithm, wherein said set number of clusters is a value within said range;
   calculating a total cost of processing for said set number of clusters of said requested items and said requesting clients, wherein said cost is based on a difference between items received and items requested by said requesting clients;
   repeating said processes of simultaneously clustering and calculating such that said cost is calculated for each of said values within said range; and
   determining a minimum overall cost of processing said client requests,
   wherein said process of simultaneously clustering said requested items and said requesting clients further comprises:
      randomly initializing fuzzy membership values of said requested items and said requesting clients;
      iteratively calculating said fuzzy membership values until a sum of changes of membership values is less than a configurable threshold value; and
      defuzzifying said fuzzy membership values to obtain actual clusters of said requested items and said requesting clients.

11. The computer program product as claimed in claim 10, said method further comprising assigning clusters of said requested items to respective clusters of said requesting clients.

12. A method of bundling messages over a client-server network to minimize an overall cost of processing client request for items in said client-server network, said method comprising:
   clustering said incoming client requests from requesting clients into clusters of requested items and clusters of said requesting clients, wherein said process of clustering incoming client requests into clusters comprises:
      randomly initializing fuzzy membership values of said requested items and said requesting clients;
      iteratively calculating said fuzzy membership values until a sum of changes of membership values is less than a configurable threshold value; and
      defuzzifying said fuzzy membership values to obtain actual clusters of said requested items and said requesting clients;
   formulating costs associated with serving said incoming client requests in said network, wherein said costs are based on a difference between items received and items requested by said requesting clients; and
   determining a cluster combination which provides a minimum overall cost of processing said incoming client requests.

13. The method of claim 12, further comprising assigning clusters of said requested items to respective clusters of said requesting clients.

14. The method of claim 12, further comprising defining a range of values for a number of clusters into which said requesting clients and said requested items are to be clustered prior to said process of clustering.

15. The method of claim 12, wherein said requested items comprise at least one of data, information and messages requested by said requesting clients.

16. The computer program product as claimed in claim 10, wherein said requested items comprise at least one of data, information and messages requested by said requesting clients.

* * * * *